United States Patent [19]

Mori et al.

[11] 4,390,948
[45] Jun. 28, 1983

[54] NAVIGATION INSTRUMENT

[75] Inventors: Kazuyuki Mori, Yokohama; Masanori Mizote; Hitoshi Takeda, both of Yokosuka; Kiyoshi Yamaki; Hidetaka Suzuki, both of Yokohama; Hiroyuki Nomura, Fujisawa; Teruo Kawasaki, Yokohama, all of Japan

[73] Assignee: Nissan Motor Co. Ltd., Kanagawa, Japan

[21] Appl. No.: 159,198

[22] Filed: Jun. 13, 1980

[30] Foreign Application Priority Data

Jun. 14, 1979 [JP] Japan .................................. 54/75458

[51] Int. Cl.$^3$ ...................... G06M 3/14; G01C 22/00
[52] U.S. Cl. ................................... 364/424; 364/561; 377/20; 377/24
[58] Field of Search ............... 364/424, 444, 446, 460, 364/561, 565, 569, 200, 900; 235/92 DN, 92 FQ, 92 T; 324/160, 166, 178

[56] References Cited

U.S. PATENT DOCUMENTS

| | | | |
|---|---|---|---|
| 3,106,636 | 10/1963 | McIntyre et al. | 364/200 |
| 3,530,382 | 9/1970 | Liston et al. | 324/178 |
| 3,637,996 | 1/1972 | Seymour | 235/92 DN |
| 3,780,272 | 12/1973 | Rohner | 235/92 DN |
| 4,068,308 | 5/1979 | Opper | 364/449 |
| 4,153,874 | 5/1979 | Kaestner | 324/161 |
| 4,158,172 | 6/1979 | Boyer et al. | 324/166 |
| 4,197,585 | 4/1980 | Moorey et al. | 235/92 FQ |
| 4,216,530 | 8/1980 | Yamaki et al. | 364/446 |
| 4,242,731 | 12/1980 | Mizote et al. | 364/444 |
| 4,244,514 | 1/1981 | Nomura et al. | 235/92 DN |
| 4,250,402 | 2/1981 | Mizote et al. | 235/92 DN |
| 4,250,403 | 2/1981 | Nomura et al. | 364/424 |
| 4,263,657 | 4/1981 | Oka et al. | 364/561 |

FOREIGN PATENT DOCUMENTS 1290051 9/1972 United Kingdom .
1526572 9/1978 United Kingdom .

OTHER PUBLICATIONS

Gosch, John, "Trip Computer Gets More Functions and Greater Intelligence", Electronics Mazagine, Apr. 19, 1979.

Primary Examiner—Gary Chin
Attorney, Agent, or Firm—Lowe, King, Price & Becker

[57] ABSTRACT

A navigation instrument comprises a first counter for counting travelling distance from a start point, a second counter for counting travelling time from starting, a means for setting a scheduled average vehicle speed, an arithmetic means for calculating average vehicle speed, the deviation of travelling distance from the scheduled distance and the deviation of travelling time from the scheduled time, and a display means for displaying the result of calculation. The first counter is capable of subtractively counting travelling distance in response to switching operation of a switching means which is incorporated to the first counter. The first counter is also incorporated with a means for stopping navigating operation which is operative when the first counter counts down the travelling distance until a given value.

9 Claims, 8 Drawing Figures

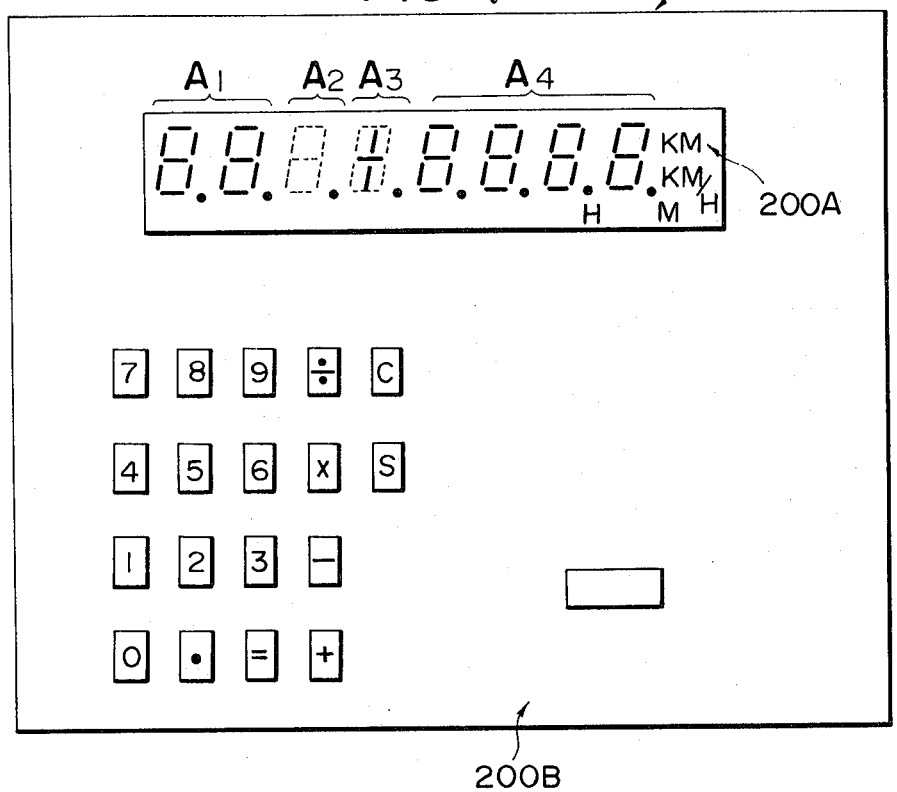
FIG. 4
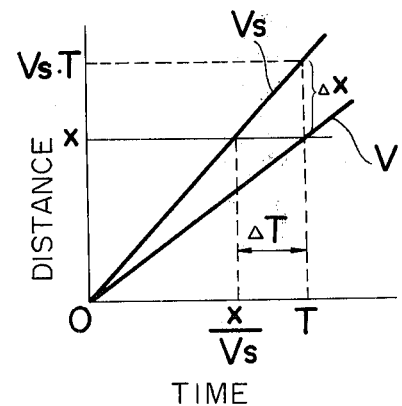
FIG. 5
FIG. 6

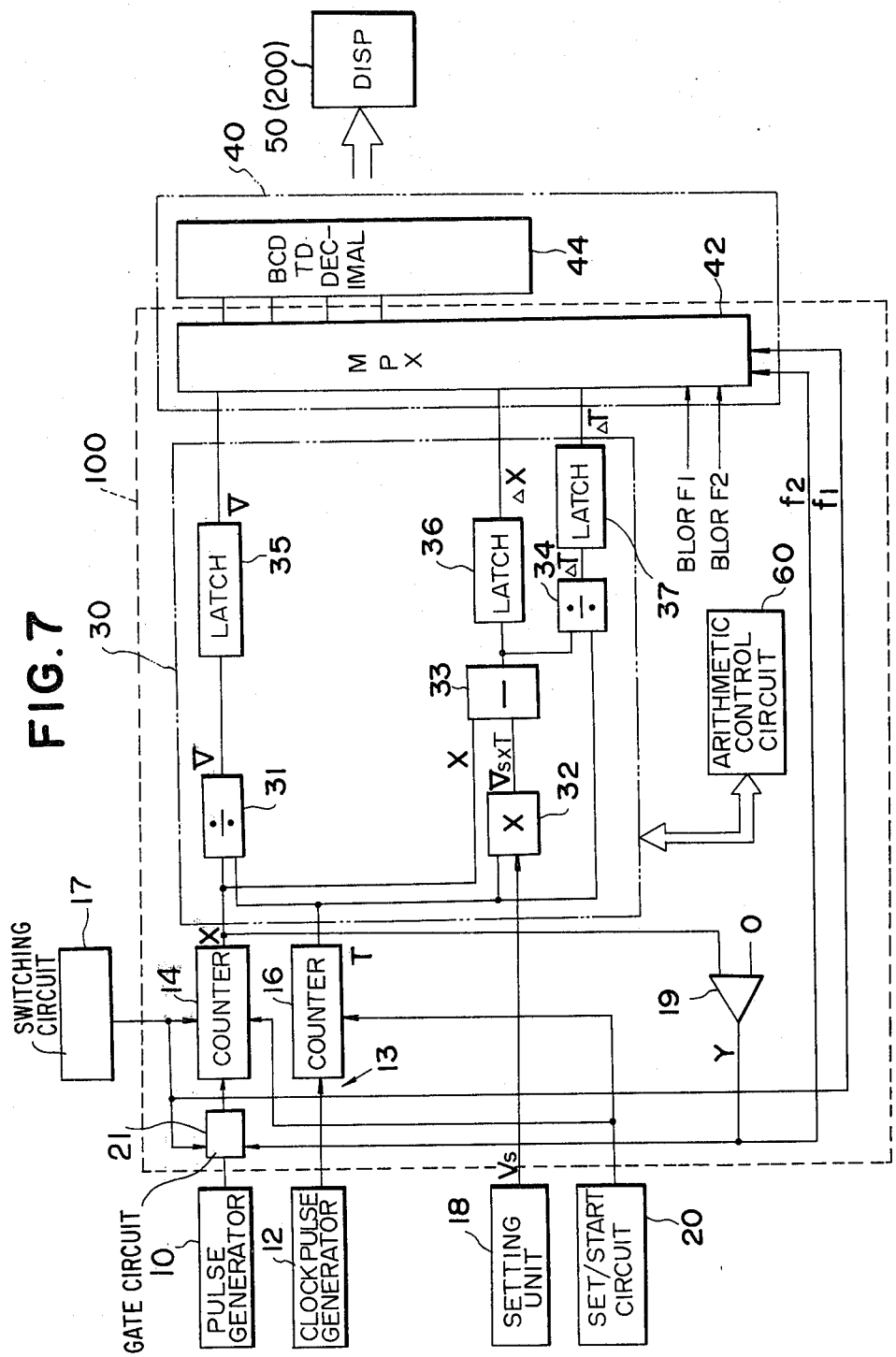

NAVIGATION INSTRUMENT

BACKGROUND OF THE INVENTION

This invention relates generally to a navigation instrument for use with roadway vehicles such as rally cars, autobuses and trucks operated on a regular run, etc. More particularly, the present invention relates to a navigation instrument having a means for counting up and counting down of travel of the vehicle in order to exactly measure travelling distance even if the driver make miss-course and returns the vehicle in the scheduled course.

Navigation instruments have been incorporated in roadway vehicles for calculating and displaying vehicle running conditions with respect to scheduled ones so that the driver can arrive at the destination on time.

Generally, as shown in FIG. 1, the navigation instruments comprise a first pulse generator 10, a clock pulse generator 12, a first and second counters 14 and 16, an arithmetic circuit 30, a display control circuit 40 and a display unit 50. The first pulse generator 10 provides a pulse every time the vehicle travels a constant distance. The first counter 14 counts the pulses fed from the pulse generator 10. The clock pulse generator 12 generates clock pulses to be fed to the second counter 16 and counts the clock pulses. A schedule speed setting unit 18 and a set/start circuit 20 are incorporated to the arithmetic circuit 30. The schedule speed setting unit sets a scheduled average speed and the set/start circuit 20 releases the reset state of the first and second counters 14 and 16 and starts navigating operation. The arithmetic circuit 30 calculates the average speed of the vehicle, the deviation of the travelling distance from a scheduled distance, and the deviation of the travelling time from a scheduled time in accordance with the contents of the first and second counters 12 and 16 and a scheduled average speed. The display control circuit 40 is responsive to the calculated results to drive the display unit 50 so that the calculated results can be sequently displayed on the display unit.

In such navigation instrument, if the driver drives the vehicle along a wrong course which is out of scheduled course and returns to the scheduled course, the first counter 14 counts the distance of miss-coursed travel as well as distance of travel along the scheduled course. This will cause error of calculation of the average speed of the vehicle, the deviation of travelling distance from a scheduled distance, and the deviation of the travelling time from a scheduled time.

SUMMARY OF THE INVENTION

Therefore, it is an object of the present invention to provide a navigation instrument capable of measuring travelling distance along the scheduled course even when the driven causes miss-coursing.

Another object of the present invention is to provide a navigation instrument having a counter for counting a travelling distance and which the counter substructively count the travelling distance so as to reduce from the counted distance a miss-coursed distance.

A further object of the present invention is to provide a navigation instrument capable of stopping navigating operation when the counter errorneously counts down the distance of travel until a given value.

To achieve the above mentioned and other objects, a navigation instrument comprises a first counter for counting travelling distance from a start point, a second counter for counting travelling time from starting, a means for setting a scheduled average vehicle speed, an arithmetic means for calculating average vehicle speed, the deviation of travelling distance from the scheduled distance and the deviation of travelling time from the scheduled time, and a display means for displaying the result of calculation. The first counter is capable of subtractively counting travelling distance in response to switching operation of a switching means which is incorporated to the first counter. The first counter is also incorporated with a means for stopping navigating operation which is operative when the first counter counts down the travelling distance until a given value.

BRIEF DESCRIPTION OF THE DRAWINGS

The present invention will be more fully understood from the detailed description given below, and from the accompanying drawings of the preferred embodiment of the present invention, which however, are not to be taken as limitative of the present invention in any way, but are for the purpose of elucidation and explanation only.

FIG. 4 is a plan view of the display unit included in the keyboard;

FIG. 5 is a diagram used in explaining a data inputting procedure;

FIG. 6 is a graph of vehicle travelling time versus vehicle travelling distance used to explain the data calculation performed in the arithmetic circuit;

FIG. 7 is a block diagram illustrating a circuit of navigation instrument having subtracting means according to a preferred embodiment of the present invention;

DESCRIPTION OF THE PREFERRED EMBODIMENT

Figure 1:
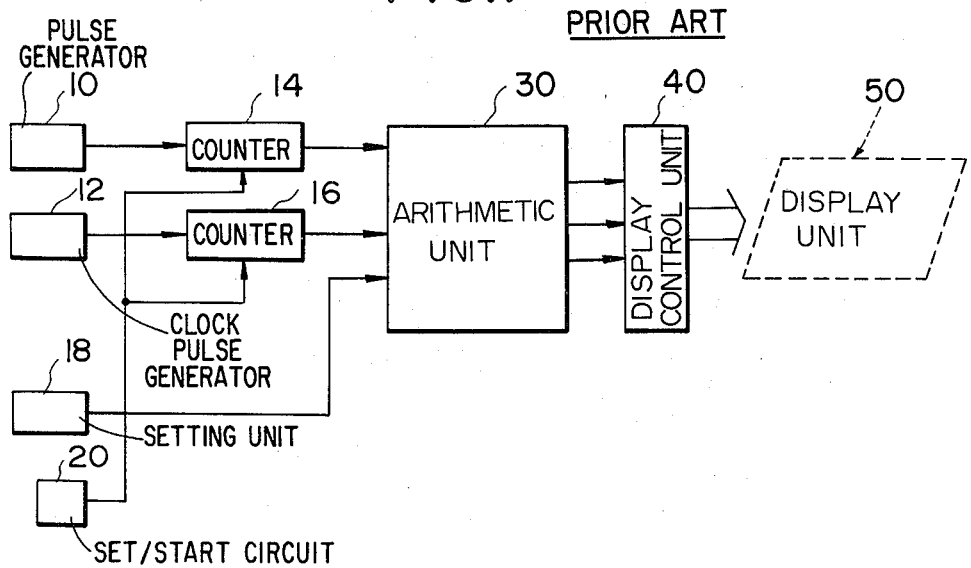
FIG. 1 is a block diagram briefly illustrating a basic structure of the conventional navigation instrument.

Referring now to the drawings, particularly to FIGS. 2 to 6, there is illustrated a fundamental and generic concept of a navigation instrument for roadway vehicle.

It should be noted that in the present specification, the elements having the same constructions and/or functions as above-explained with reference to FIG. 1, are represented the same reference numerals for simplification of the explanation and for avoiding confusion.

Figure 2:
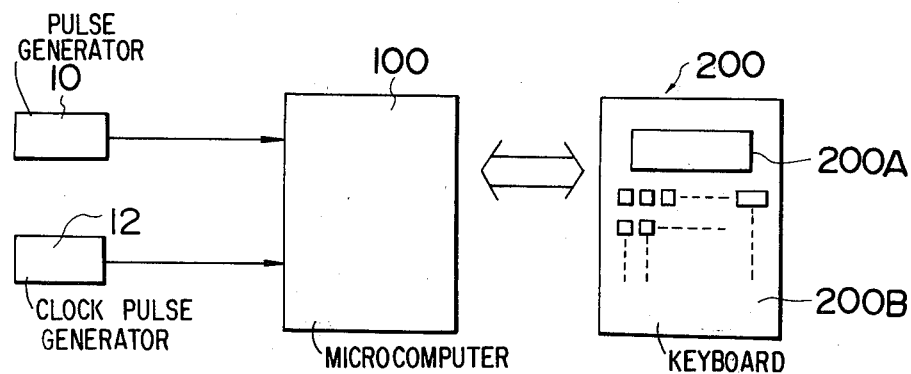
FIG. 2 is a block diagram briefly illustrating the basic structure of the navigation instrument of the present invention.

In FIG. 2, is briefly shown a navigation instrument in block diagram form. The navigation instrument has a pulse generator 10 for generating a pulse every time the vehicle travels a constant distance and thereby acting as distance detector for detecting the distance of travel of a vehicle from a starting point. A clock pulse generator 12 generates clock pulses and acts as a timer detector for detecting the length of time which takes the vehicle to travel the distance, A microcomputer 100 includes a central processing unit (CPU) for calculating the average speed of the vehicle, the deviation of the detected travelling distance from a scheduled distance, and the deviation of the detected travelling time from a scheduled time according to the detected travelling distance and time and a scheduled average speed and for storing the calculated results therein.

The navigation instrument also comprises a keyboard 200 including a display unit 200A and a keyboard switch unit 200B for use in writing and reading data out of a memory (not shown) included in the microcomputer 100 so that the data, calculated in the microcomputer 100 in accordance with the inputted information is displayed on the display unit 200A.

Figure 3:
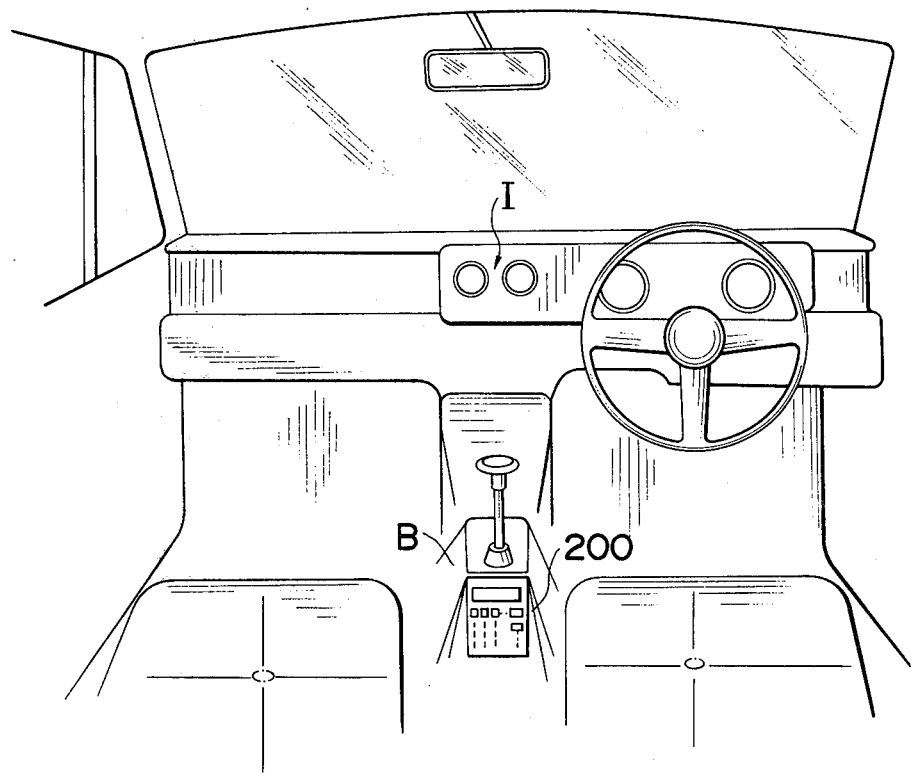
FIG. 3 is a perspective view illustrating the keyboard placed on the console box of a vehicle.

As shown in FIG. 3, the keyboard 200 may be placed on the console box B of the vehicle or any other suitable position convenient for the driver to operate it. The display unit 200A may be separated from the keyboard 200 and placed on the instrument panel of the vehicle or any other suitable position convenient for the driver to view it. The microcomputer 100 may be placed on the rear surface of the keyboard 200 or any other suitable position.

The keyboard 200 will be described in greater detail with reference to FIG. 4. The display unit 200 is shown as comprised of 7 or 9 segment digit indicator tubes (digitrons). The first four-figure section $A_1$ is for indication of one of the calculated data, and the second one-figure section $A_2$ is for indication of the symbol + or − when the magnitude of the data displayed on the first section $A_1$ is larger or smaller than that of a corresponding scheduled data. The section $A_3$ next to the section $A_2$ is blanked and the last two-figure section $A_4$ is for indication of a scheduled average vehicle speed. The key switch unit 200B has thereon a navigation instrument function key "NAVI", digit keys "0" to "9", an indication cancelling key "C", and a set/start key "S". Unit indication lamps are designated by the letters "KM", "KM/H", "H", and "M" which light in accordance with the dimention of each displayed data for indicating that the data is displayed in kilometer, kilometer per hour, hour and minute, respectively.

The procedure of the keyboard 200 will be described with reference to FIG. 5. For sake of an example, it will be assumed that an average speed of 48 km/h was previously set and another average speed of 55 km/h is required to be set. First, the function key "NAVI" is depressed to clear the previous data and to place the navigation instrument on standby. The digit key "5" is then depressed to display a digit "5" on the first place of the two-figure section $A_4$ and subsequently the digitl key "5" is depressed again to display a digit "55" on the section $A_4$. When the set/start key "S" is depressed after the average speed is newly set, calculations are performed in the microcomputer 100 on each occasion with respect to the newly scheduled average speed of 55 km/h and the calculated results such as a travelling distance deviation (+2.1 km in the illustrated case), an average vehicle speed (46 km/h in the illustrated case), and a travelling time deviation (2 minutes in the illustrated case) are sequenty displayed at a predetermined interval.

Here, explanation will be made of calculation of the average speed of the vehicle, and the travelling distance and time deviations according to a scheduled average vehicle speed, and the detected travelling distance and time with reference to FIG. 6. Assuming that X is the distance of travel of the vehicle at a time T, $\Delta X$ is the deviation of the travelling distance X from a scheduled travelling distance, and $\Delta T$ is the deviation of the travelling time T from a scheduled time, the travelling average speed V and the travelling distance and time deviations X and T are expressed as:

$$V = X/T \ldots (1)$$

$$\Delta X = Vs\, T - X \ldots (2)$$

$$\Delta T = T - X/Vs = \Delta X/Vs \ldots (3)$$

were Vs is a scheduled average speed.

Referring to FIG. 7, there is illustrated in more detail a preferred embodiment of the present invention. The distance detector 11 includes a pulse generator 10 for providing a pulse every time the vehicle travels a constant distance and a first counter 14 for counting the pulses fed thereto from the pulse generator 10. The first counter 14 is incorporated a switching circuit 17 and has an up/down function. When the switching circuit 17 is turned to upside, the first counters 14 operates to count up, otherwise the first counter operates to count down. The time detector 13 includes a clock pulse generator 12 including a crystal oscillator and a second counter 16 for counting the clock pulses fed thereto from the clock pulse generator 12. A scheduled speed setting unit 18 is provided for use in setting a scheduled average speed Vs. The outputs of the distance detector 11, the time detector 13, and the speed setting unit 18 are coupled to an arithmetic unit 30. The arithmetic unit 30 comprises a first divider 31 for dividing the output (travelling distance X) from the first counter 14 by the output (travelling time T) from the second counter 16 to provide a vehicle average speed V, a multiplier 32 for multiplying the output T from the second counter 16 by the output (scheduled vehicle speed Vs) from the speed setting unit 18 to provide a scheduled travelling distance Vs T, a subtractor 33 for subtracting the output X of the first counter 14 from the output Vs T of the multiplier 32 to provide a travelling distance deviation $\Delta X(Vs\, T - X)$, a second divider 34 for dividing the output $\Delta X$ of the subtractor 33 by the output Vs of the speed setting unit 18 to provide a travelling time deviation $\Delta T = \Delta X/Vs$, and latch circuits 35, 36 and 37 for temporarily storing the outputs V, $\Delta X$ and $\Delta T$ from the arithmetic circuits 31, 33 and 34, respectively.

The contents of the latch circuits 35, 36 and 37 are fed to a display control unit 40 which comprises a multiplexor 42 serving as a data selector for sequentially selecting the binary coded decimal (BCD) data signal fed thereto from the latch circuits 35, 36 and 37, and a decoder/driver 44 for converting the selected BCD data signals into decimal data signals to drive defined digit indicator tubes of the display unit 200A. The timing of arithmetic operation of each arithmetic circuit and the timing of operation of each latch circuit are controlled by a arithmetic control circuit 60.

The first counter 14 is also incorporated with a digital comparator 19. When the first counter 14 outputs zero, the digital comparator 19 outputs a signal. The comparator signal is fed to a gate circuit 21 interposed between the pulse generator 10 and the first counter 14. Responsive to the comparator signal, the gate circuit 21 becomes inoperative to interrupt the pulse signal fed to the first counter 14.

A zero-flashing signals F1 and F2 are applied to the multiplexor 52 while signals f1 and f2 are applied to the multiplexor 52 respectively from the switching circuit 17 and the digital comparator 19, thereby causing the decoder/driver 54 to drive defined digit indicator tubes of the display unit 200A at a relatively short interval such as one less than 0.5 second so that the defined digits "0" appear to be flashing. Instead of the zero-flashing signal F1 and F2, a blanking signal BL may be applied to the multiplexor 52, in which case, the multiplexor 52 prohibits the decoding function of the decoder/driver 54 so that no indication appears on the display unit 200A while signals f1 and f2 are applied to the multiplexor respectively fed from the switching circuit 17 and the digital circuit 19.

The operation of the present invention will now be described. The driver operates the function key "NAVI" to place the navigation instrument on standby, operating some digit keys to set a scheduled average speed, for example, of 50 km/h in the speed setting unit 18, and operating a set/start circuit 20 to release the reset states of the first and second counters 14 and 16. The divider 31 divides the content X of the first counter 14 by the content T of the second counter 16 to provide an average vehicle speed X/T which is stored in the latch circuit 35. The multiplier 22 multiplies the output Vs of the speed setting unit 18 by the content T of the second counter 16 to provide a scheduled travelling distance Vs T which is applied to the subtractor 33. The subtractor 33 subtracts the content X of the first counter 14 from the output Vs T of the multiplier 33 to provide a travelling distance deviation $\Delta X = Vs\ T - X$ which is stored in the latch circuit 36. The second divider 34 divides the output $\Delta X$ of the subtractor 33 by the output Vs of the vehicle speed setting unit 18 to provide a travelling time deviation $\Delta T$ which is stored in the latch circuit 37.

Figure 8:
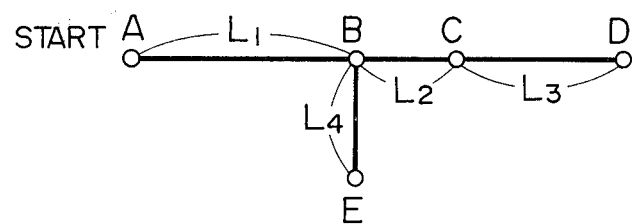
FIG. 8 is a illustration of one of example of travelling of the vehicle.

Now, assuming to travelling from point A to D via points B and C, as shown in FIG. 8 and distances to respective next points being $L_1$ to $L_3$, and further assuming from the point B travelling to E where is $L_4$ of distance from the point B. At the starting point A, the set/start switch 20 is depressed to operate the navigation instrument. Then, the first counter 14 starts counting up distance of travel. When the vehicle arrives at the point E through the point B, the counter 14 counts distance $L_1 + L_4$. At the point E, by turning the switch 17, the counter 14 becomes subtracting counter to count down the distance of travel. At this time, by application of signal f1 to the multiplexor 42, the zero-flashing signal F1 or the blanking signal BL is applied to the multiplexor 42 to indicate on the display 50 that the first counter 14 is acting as subtracting counter.

When the vehicle reaches at the point B again, the counted distance is $L_1 + L_4 - L_4 = L_1$. Here, the switch 17 is turned again to return the counter to count up the distance of travel. Thereafter, the counter counts up a distance of travel to the point D. Thus, the navigation instrument according to the present invention can exactly measure the distance of the scheduled course. By this, inspite of miss-coursing, the arithmetic circuit 30 exactly calculates the average speed of the vehicle, the deviation of the travelling distance from a scheduled distance and the deviation of travelling time from a scheduled time based on the contents of the first and second counters 14 and 16, and thereby display unit can displays exact result of calculation for monitoring.

On the other hand, if the switch 17 is not turned at the point B and therefore, the first counter 14 is maintained to act as subtracting counter, the distance of travel is further counted down. At the point where is far from the point B at a distance $L_1$, the counter contents becomes zero. Responsive to outputting zero of the counter 14, the digital comparator 19 outputs the signal f2. The signal f2 is fed to the gate circuit 21 to interrupt feeding the pulse fed from the pulse generator 10 to the counter 14. At the same time, the signal f2 is also fed to the multiplexor 42. Responsive to the signal f2, the multiplexor 42 selects the zero-flashing signal F2 or blanking signal BL. Preferably, displaying of stopping of operation is varied from that indicative of counting down the distance of travel. For example, it will be possible that either one of signals F1 or F2 is substituted for the signal BL. Namely, for example when the signal f1 is applied to the multiplexor 42, the multiplextor selects the signal F1 and when the signal f2 is applied, selects the signal BL.

Although in the shown example, for indicating counting down of the distance of travel and stopping of navigating operation, there is used the display unit 50, it is posible to use an indication lamp or warming buzzer. Further, it is possible to stop the navigation operation at desired counter value.

What is claimed is:

1. A navigation instrument for use with a roadway vehicle comprising:
    distance detecting means for detecting travelling distance of the vehicle from a starting point and producing a signal showing the detected distance of travel of the vehicle, said distance detecting means selectively counting up and down the travelling distance;
    a manually operable switching means for switching operation of said distance detecting means between counting up and down;
    a stopping means, associated with said distance detecting means, for stopping counting down operation when the distance detecting means counts down the travelling distance until a given value is reached;
    time detecting means producing a signal showing the length of time which the vehicle takes to travel said distance;
    speed setting means producing a signal showing a scheduled average speed;
    arithmetic means responsive to said vehicle travelling distance and time showing signals and said scheduled average speed showing signal, and producing three data signals showing the average speed of the vehicle, the deviation of the travelling distance from a scheduled one, and the deviation of the travelling time from a scheduled one;
    signal selector means responsive to a data selector command from said arithmetic means, and sequentially outputting one of said three data signals from said arithmetic means; and
    display means responsive to each signal applied thereto from said signal selector means for displaying the content represented by the signal.

2. A navigation instrument as set forth in claim 1 or, wherein said switching means generate a first signal when said distance detecting means is subtractively operated, said first signal is fed to said display means for indicating travelling distance being counted down.

3. A navigation instrument as set forth in claim 1 or, wherein said navigating operation stopping means generates a second signal when said distance detecting means counts down the travelling distance until said given value, said second signal is fed to said display means for indicating navigating operation being stopped.

4. A navigation instrument for use with a road way vehicle, comprising:

distance detecting means for detecting travelling distance of the vehicle from a starting point and producing a signal showing the detected distance of travel of the vehicle, said distance detecting means selectively counting up and counting down the travelling distance;

a manually operable switching means for switching operation of said distance detecting means between counting up and down, said switching means incorporating a signal generator for producing a signal indicative of the counting down operation of the distance detecting means;

a stopping means, associated with said distance detecting means, for stopping counting down operation when the distance detecting means counts down the travelling distance until a given value is reached;

time detecting means producing a signal showing the length of time which the vehicle takes to travel said distance;

speed setting means producing a signal showing a scheduled average speed;

arithmetic means responsive to said vehicle travelling distance and time showing signals and said scheduled average speed showing signal, and producing three data signals showing the average speed of the vehicle, the deviation of the travelling distance from a scheduled one, and the deviation of the travelling time from a scheduled one;

signal selector means responsive to a data selector command from said arithmetic means, and sequentially outputting one of said three data signals from said arithmetic means; and display means responsive to each signal applied thereto from said signal selector means, said display means including an indicator indicating the distance detecting means operation of counting up and down the travelling distance.

5. A navigation instrument comprising:

distance detecting means for detecting travelling distance of a vehicle from a starting point and producing a signal showing the detected distance of travel of the vehicle, said distance detecting means selectively counting up and down the travelling distance;

manually operable switching means for switching operation of said distance detecting means between counting up and down, said switch means producing a down count signal while it effects down counting operation;

stopping means for comparing a value counted down by said distance detecting means with a predetermined value and producing a stop signal to be fed to said distance detecting means for stopping counting operation thereof, said stopping means being responsive to said down count signal for sequentially comparing the counted value with said predetermined value while the down count signal is present;

time detecting means for detecting travelling time of the vehicle and producing a signal showing the length of time which it takes the vehicle to travel said detected distance;

setting means for setting a scheduled average speed of the vehicle;

arithmetic means for calculating the average travelling speed of the vehicle, the deviation of travelling distance from a scheduled distance and the deviation of travelling time from a scheduled time and, in response, generating three corresponding data signals;

signal selector means, responsive to a data selector command fed from said arithmetic means, for sequentially outputting one of said three data signals from said arithmetic means;

display means, responsive to each signal applied thereto from said signal selector means, for displaying the content of said each applied signal; and down count indicator means incorporated in said display means and responsive to said down count signal for indicating that the distance detecting means counts down the travelling distance while the down count signal is present.

6. A navigation instrument comprising:

distance detecting means, incorporating a pulse generator for producing a pulse train sequence of pulses for unit distances of vehicle travel and counter means for counting number of said pulses of said pulse train, for detecting travelling distance of the vehicle from the starting point and producing a signal showing the detected distance travelled by the vehicle, said counter means in said distance detecting means including an up/down counter for selectively counting up and counting down of the travelling distance;

manually operable switching means for switching an operation mode of the counter of the distance detecting means between counting up and counting down, said switching means sequentially producing a down count signal while said counter is in a down counting mode;

comparing means, responsive to said down count signal, for comparing the counted value of said counter represented by the travelling distance showing signal with a predetermined value, said comparing means producing a stop signal when the counted value in the counter is counted down to said predetermined value;

input inhibit means, responsive to said stop signal, for inhibiting said pulse train to input to said counter in order to stop counting operation of said counter in said distance detecting means, said input inhibiting means producing an input inhibit signal;

time detecting means for detecting travelling time of the vehicle and producing a signal showing the length of time which the vehicle takes to travel said detected distance;

setting means for setting a scheduled average speed of the vehicle;

arithmetic means for calculating the average speed of the vehicle, deviation of travelling distance from a scheduled distance and deviation of travelling time from a scheduled time and in response thereto developing three corresponding data signals, based on said signals respectively showing detected travelling distance and travelling time;

signal selector means, responsive to a data selector command fed from said arithmetic means, for sequentially outputting one of said three data signals from said arithmetic means;

display means, responsive to each signal applied thereto from said selector means, for displaying the content of each said applied signal; and down count indicator means, incorporated in said display means and responsive to said down count signal and said input inhibit signal, for indicating down counting operation of the counter in said distance detecting means while said down count signal is present and indicating stopping of counting operation of said counter of said distance detecting means while said input inhibit signal is present.

7. The navigation instrument as set forth in claim 5 or 6, wherein said indication of down count operation of said distance detecting means is a visual sign displayed on said display means.

8. The navigation instrument as set forth in claim 5 or 6, wherein said indication of down count operation of said distance detecting means is audible.

9. The navigation instrument as set forth in claim 6, wherein said indication of down count operation of said distance detecting means is a visible sign on the display means which is turned on in response to said down count signal and said indication of said input inhibiting state of the distance detecting means is audible and produced in response to said input inhibit signal.

* * * * *